(No Model.)
J. F. WERNICKE.
HOE.
No. 591,710. Patented Oct. 12, 1897.
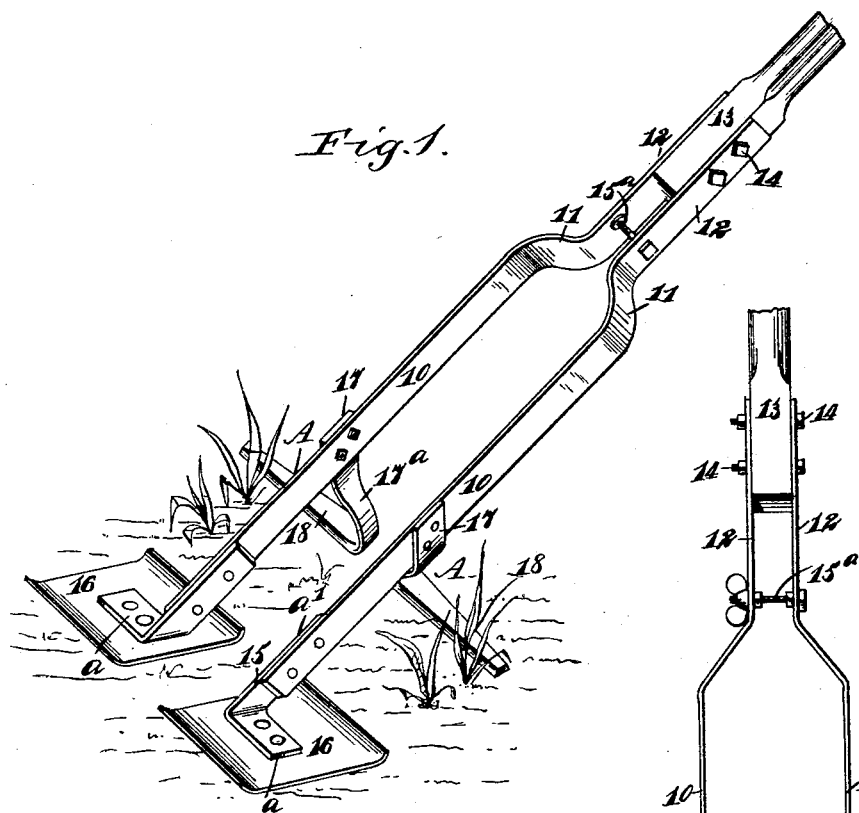
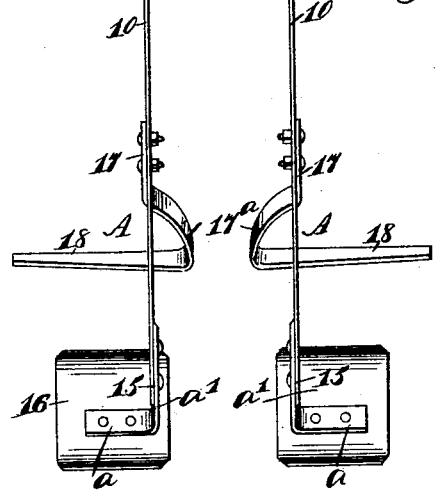
WITNESSES:
INVENTOR
J. F. Wernicke.
BY
ATTORNEYS.

UNITED STATES PATENT OFFICE.

JOHN F. WERNICKE, OF DOLTON, ILLINOIS.

HOE.

SPECIFICATION forming part of Letters Patent No. 591,710, dated October 12, 1897.

Application filed April 6, 1896. Serial No. 586,404. (No model.)

*To all whom it may concern:*

Be it known that I, JOHN F. WERNICKE, of Dolton, in the county of Cook and State of Illinois, have invented a new and useful Improvement in Hoes, of which the following is a full, clear, and exact description.

My invention relates to that class of cultivator-hoes in which the handles are pushed in front of the operator and have runners or wheels upon their lower ends which run upon the ground and cultivator-blades in rear of such bearings.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a perspective view of the improved hoe, and Fig. 2 is a plan view of the same.

In carrying out the invention the frame of the hoe is constructed of two substantially parallel spring side pieces 10, usually made of steel, and near their upper ends the said side pieces are given an inward curve or inclination 11 and are thence carried again parallel to form shanks 12, the said shanks being attached to the handle 13 through the medium of bolts 14 or their equivalents. If in practice it is found desirable, the frame may be constructed of other material than steel.

The forward ends of the members of the frame are each attached directly to a bracket 15. The aforesaid brackets comprise a horizontal foot member $a$ and a shank member $a'$, which extends upwardly and rearwardly, and the lower extremities of the members of the frame are placed parallel with the shanks of the brackets, engaging with their outer faces, and are permanently attached to the brackets by rivets or like fastening devices.

The foot sections or members of the brackets extend outwardly or in direction of the opposite sides of the frame, and each foot-section of a bracket is secured by rivets or other fastening devices to a shoe 16, which shoes have a smooth under face and are preferably made of solid metal, and their forward and rear ends are upwardly turned, so that when in contact with the ground the said shoes may move readily over the same and will present practically no more frictional engagement than wheels, if substituted for the shoes. The shoes, however, enable the frame of the hoe to be brought more closely to the ground and to be better manipulated to bring into active operation the blades of the hoe.

The blades A are preferably two in number, one being secured to each of the side portions 10 of the body by means of any approved fastening device or devices. Each blade consists of a shank 17, which is attached ordinarily to the outer face of the frame member 10, the said shank being provided with an inwardly-curved lower section $17^a$ and a cutting section or blade proper, 18, being ordinarily and preferably continuous with the shank. The blades 18 extend at an angle outwardly from the curved portions $17^a$ of their shanks under and beyond the frame members 10, the forward edge of the said blades 18 being beveled or sharpened to form a continuous cutting edge. The hoe-blades are placed on the frame opposite each other, and their cutting-surfaces extend outward in opposite directions, as shown in both figures. The frame members 10 are drawn together or may be separated a predetermined distance apart through the medium of a tension-screw 15 or a like device, which screw is passed through the shank portions 12 of the frame of the hoe, the squared head portion of the screw being located in a corresponding opening in one shank, while the threaded portion of the screw is passed loosely through an opening in the opposing shank and carries a lock-nut at its outer end.

It is evident that when a hoe is constructed in this manner the shoes afford a purchase for the frame as well as being a guide for it, enabling the blades to be manipulated to the best possible advantage, and in the event the hoe-blades should encounter an obstruction the members of the frame, being of spring material, will separate to such an extent as not to injure the plants near which the hoe-blades may be, or in some instances the frame may be drawn outwardly by an obstruction to an extent that will enable the hoe-blades to clear the plants, although very near them.

Having thus described my invention, I claim as new and desire to secure by Letters Patent—

The combination with a single handle-bar 13, of two parallel elastic shank-bars 10, 10 bent inwardly at their upper ends and secured to opposite sides of the handle-bar by means of bolts, an adjusting-screw 15ª connecting the shanks below their connection with the handle, said shank-bars having runners at their lower ends adapted to bear upon the ground, and cutting-blades attached to the elastic shank-bars above the runners and extending downwardly, inwardly and outwardly, substantially as shown and described.

JOHN F. WERNICKE.

Witnesses:
F. A. REICH,
G. KOCH.